G. W. RANDOLPH.
CORN PLANTER MARKER.
APPLICATION FILED SEPT. 4, 1915.

1,164,393. Patented Dec. 14, 1915.

WITNESSES

INVENTOR
G. W. Randolph
BY
ATTORNEYS

UNITED STATES PATENT OFFICE.

GEORGE W. RANDOLPH, OF WINAMAC, INDIANA.

CORN-PLANTER MARKER.

1,164,393.  Specification of Letters Patent.  Patented Dec. 14, 1915.

Application filed September 4, 1915. Serial No. 49,057.

*To all whom it may concern:*

Be it known that I, GEORGE W. RANDOLPH, a citizen of the United States, and a resident of Winamac, in the county of Pulaski and State of Indiana, have invented certain new and useful Improvements in Corn-Planter Markers, of which the following is a specification.

My invention relates to corn planters, and one of the main objects thereof is to provide means for marking a plurality of rows suitably spaced apart during the planting operation, ready for guiding the planter on its return trip, back and forth over a field.

In the present method but one row is marked, the horses drawing the planter walking on opposite sides thereof; if the horses go straight, all is well, but if the driver goes six inches to right or left going one way and repeats this on the way back the rows are spaced either one foot too far apart or one foot too close to each other. With my device, however, one mark is provided for each horse, and the horses will soon become accustomed thereto and straight rows will always result.

Another object of the invention is to provide means in such devices for compensating for inequalities or uneven surface conditions in an automatic manner, in order to mark the rows clearly under all conditions.

My invention is fully described in the following specification, of which the accompanying drawings form a part, in which like characters refer to like parts in each of the views, and in which:—

Figure 1:
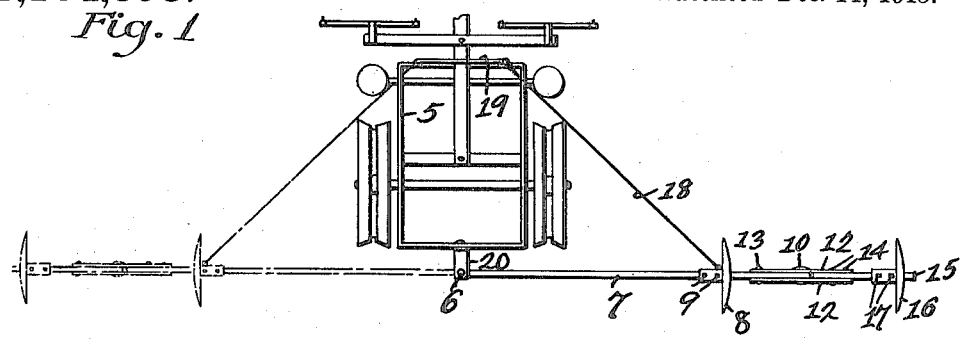
Figure 2:
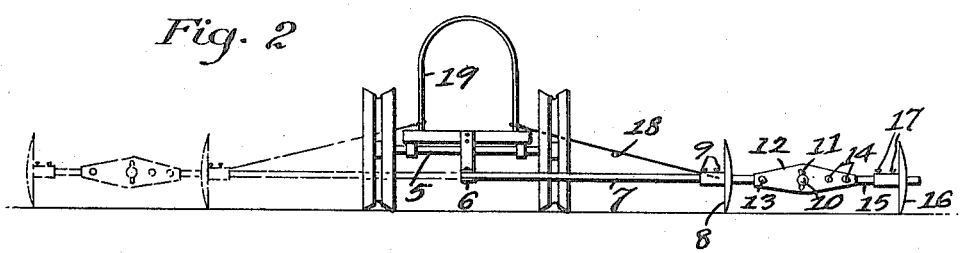
Figure 3:
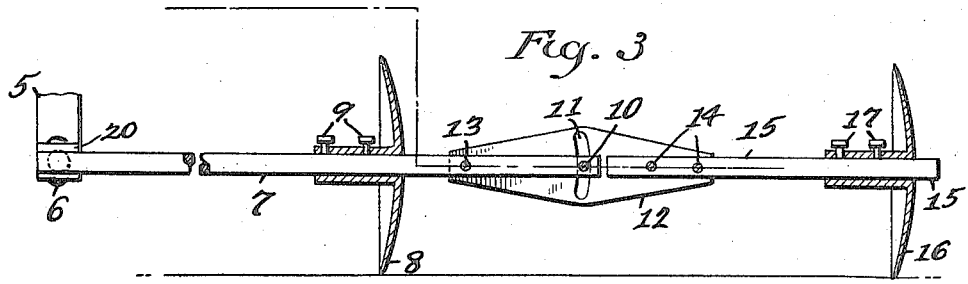
Figure 4:
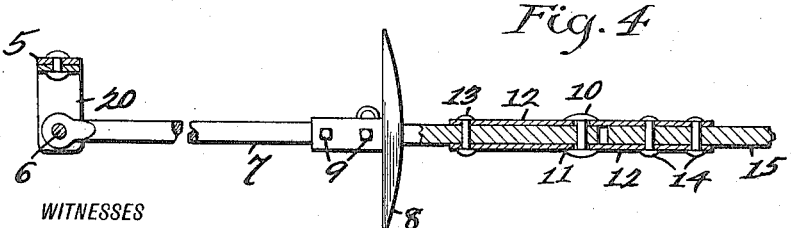

Figure 1 is a plan view of a corn planter provided with my invention in operative position thereon; Fig. 2 is a rear elevation thereof; Fig. 3 is an enlarged rear elevation of the marker detached; and Fig. 4 is a fragmentary section taken on the line 4—4 of Fig. 3.

At 5 I have shown a planter of any desired type, and at the rear of the frame thereof I arrange a vertical pivot 6 for a beam 7 provided with a marking disk 8 adjustable along the length thereof and locked thereto by means of screws 9 or suitable equivalent. The outer end of the beam 7 is provided with a pin 10 which is locked in an arcuate slot 11 in a plate 12 pivoted to the beam 7 at 13, said plate thus being capable of limited and unobstructed movement with respect to the beam. The other end of said plate is secured, as by bolts 14, to a supplemental beam 15 which carries a marking disk 16 adjustably thereon, and adapted to be locked thereto by means of screws 17 or equivalent, and it will be seen from this construction that the marking disk 16 may move in a vertical plane independently of the marking disk 8, and the latter may move in a vertical plane independently of the former, thereby insuring positive contact of both disks with the earth at all times.

The beam 7 is held transversely to the path of movement of the planter by means of a stay 18, the forward end of which is in slidable engagement with a yoke-shaped rod 19 on the forward part of the planter whereby, when the beam 7 is thrown to the opposite side of the planter indicated by dotted lines in Figs. 1 and 2, the stay operates in the same manner as on the side shown in full lines, the pivot 6 being carried by a swiveled extension 20 in order to permit the beam to be swung through an arc of a circle in a vertical plane.

My device is very simple, thoroughly efficient, readily attached to planters of any form and for any farm product, light and compact, and comparatively inexpensive, and I reserve the right to make any desired changes over the form shown which are within the spirit of the invention and the scope of the following claim.

Having fully described my invention, what I claim as new, and desire to secure by Letters Patent, is:—

The combination with a planter, of a beam, swivel means for holding the same to said planter, a marking disk on said beam, a supplemental beam, a plate secured thereto provided with an arcuate slot, a pin on said first named beam held in said slot, a pivot through said first named beam and the respective end of said plate, a stay for maintaining said beams transversely of said planter, and a supplemental marking disk on said supplemental beam.

In testimony whereof I have signed my name to this specification in the presence of two subscribing witnesses.

GEORGE W. RANDOLPH.

Witnesses:
  W. L. OVERHOLSER,
  O. J. OBRIGHT.

Copies of this patent may be obtained for five cents each, by addressing the "Commissioner of Patents, Washington, D. C."